United States Patent
Chang et al.

(10) Patent No.: US 8,656,090 B2
(45) Date of Patent: Feb. 18, 2014

(54) METHOD FOR PERFORMING BLOCK MANAGEMENT, AND ASSOCIATED MEMORY DEVICE AND CONTROLLER THEREOF

(75) Inventors: Ching-Chin Chang, Kaohsiung (TW); Po-Sheng Chou, New Taipei (TW); Yang-Chih Shen, Taipei (TW)

(73) Assignee: Silicon Motion Inc., Jhubei, Hsinchu County (TW)

( * ) Notice: Subject to any disclaimer, the term of this patent is extended or adjusted under 35 U.S.C. 154(b) by 253 days.

(21) Appl. No.: 13/189,588

(22) Filed: Jul. 25, 2011

(65) Prior Publication Data

US 2012/0079170 A1    Mar. 29, 2012

(30) Foreign Application Priority Data

Sep. 27, 2010    (TW) .............................. 99132562 A

(51) Int. Cl.
*G06F 13/10*        (2006.01)
(52) U.S. Cl.
USPC ........................................................ 711/103

(58) Field of Classification Search
None
See application file for complete search history.

(56) References Cited

U.S. PATENT DOCUMENTS

| | | | |
|---|---|---|---|
| 2006/0271725 A1* | 11/2006 | Wong | 711/103 |
| 2009/0172335 A1* | 7/2009 | Kulkarni et al. | 711/170 |
| 2010/0250826 A1* | 9/2010 | Jeddeloh | 711/103 |

* cited by examiner

*Primary Examiner* — Duc Doan
(74) *Attorney, Agent, or Firm* — Winston Hsu; Scott Margo

(57) ABSTRACT

A method for performing block management is provided. The method is applied to a controller of a Flash memory having multiple channels, where the Flash memory includes a plurality of blocks respectively corresponding to the channels. The method includes: obtaining at least one portion of a plurality of address-to-channel mapping relationships, for use of writing/programming operations; and according to at least one address-to-channel mapping relationship of the plurality of address-to-channel mapping relationships, programming at least one page of data into the Flash memory through at least one channel in a page mode. An associated memory device and a controller thereof are also provided.

20 Claims, 9 Drawing Sheets

| Ch(0) | Ch(1) | Ch(2) | Ch(3) |
|---|---|---|---|
| 0,....,7 | 8,....,15 | 16,....,23 | 24,....,31 |
| 32,....,39 | 40,....,47 | 48,....,55 | 56,....,63 |
| ⋮ | ⋮ | ⋮ | ⋮ |

FIG. 1B

| Ch(0) | Ch(1) | Ch(2) | Ch(3) |
|---|---|---|---|
| Logical page address | Logical page address | Logical page address | Logical page address |
| 0x0000 | 0x0001 | 0x0002 | 0x0003 |
| 0x0004 | 0x0005 | 0x0006 | 0x0007 |
| 0x0008 | 0x0009 | 0x0010 | 0x0011 |
| ⋮ | ⋮ | ⋮ | ⋮ |
| 0x(4m) | 0x(4m+1) | 0x(4m+2) | 0x(4m+3) |
| ⋮ | ⋮ | ⋮ | ⋮ |

FIG. 1C

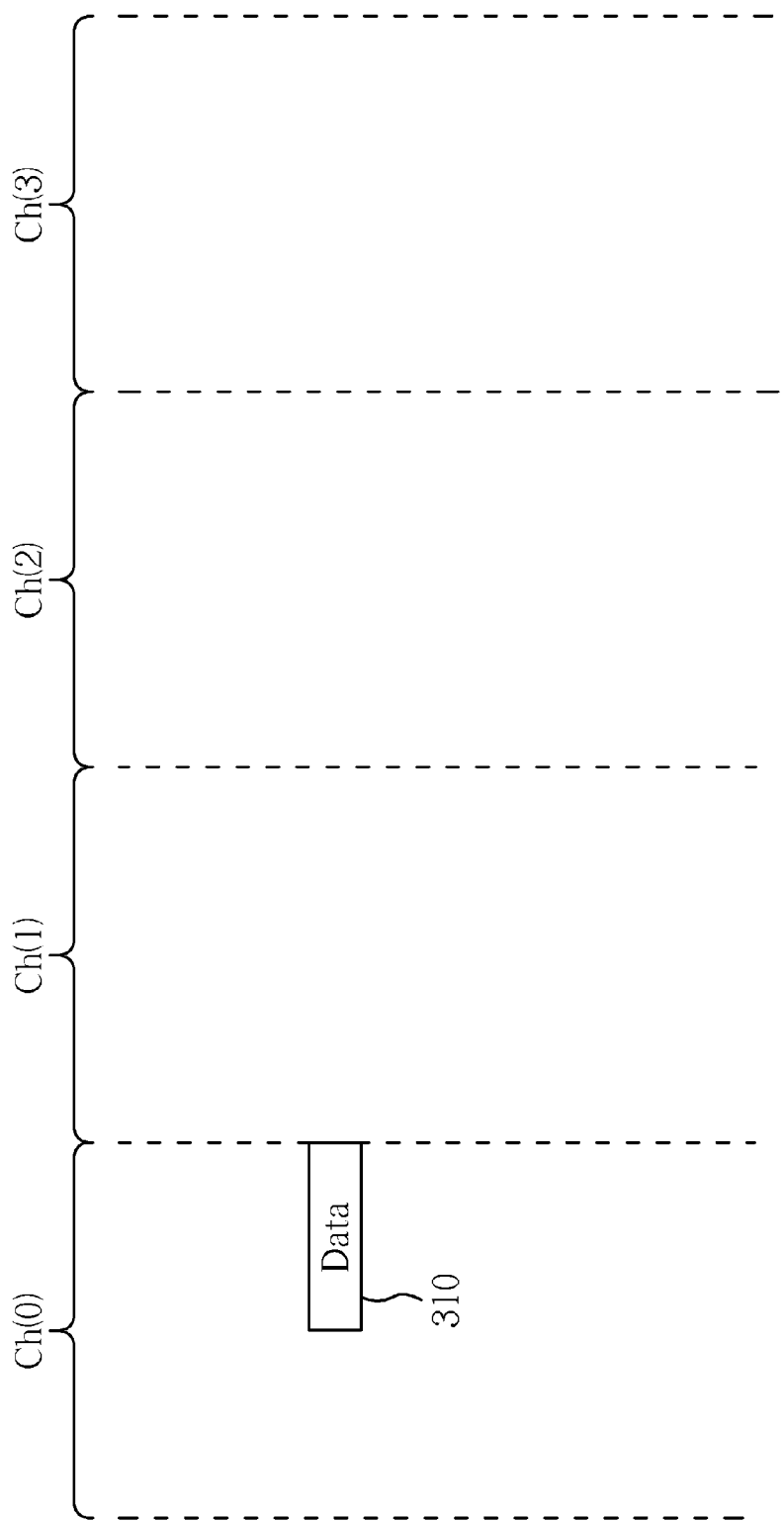

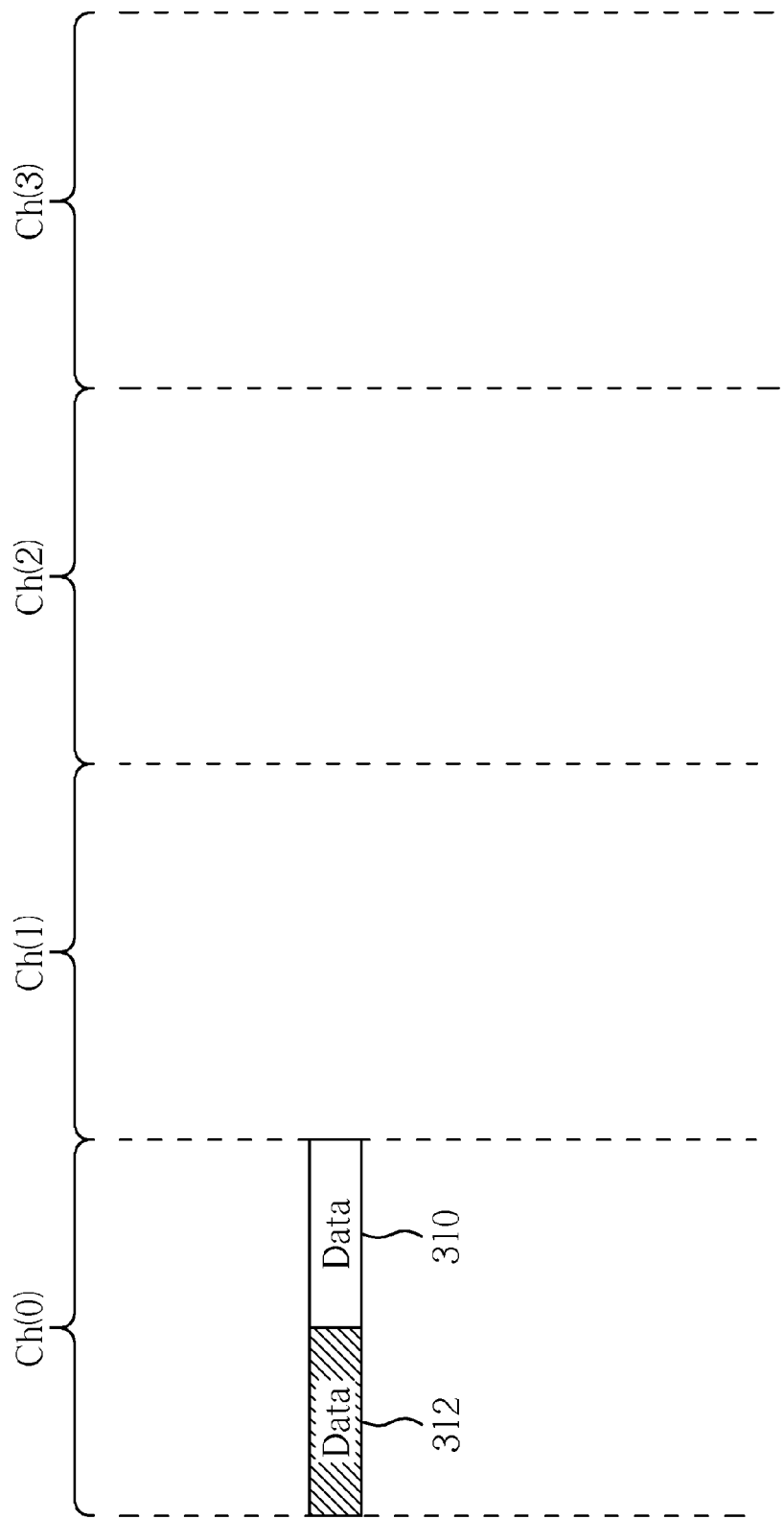

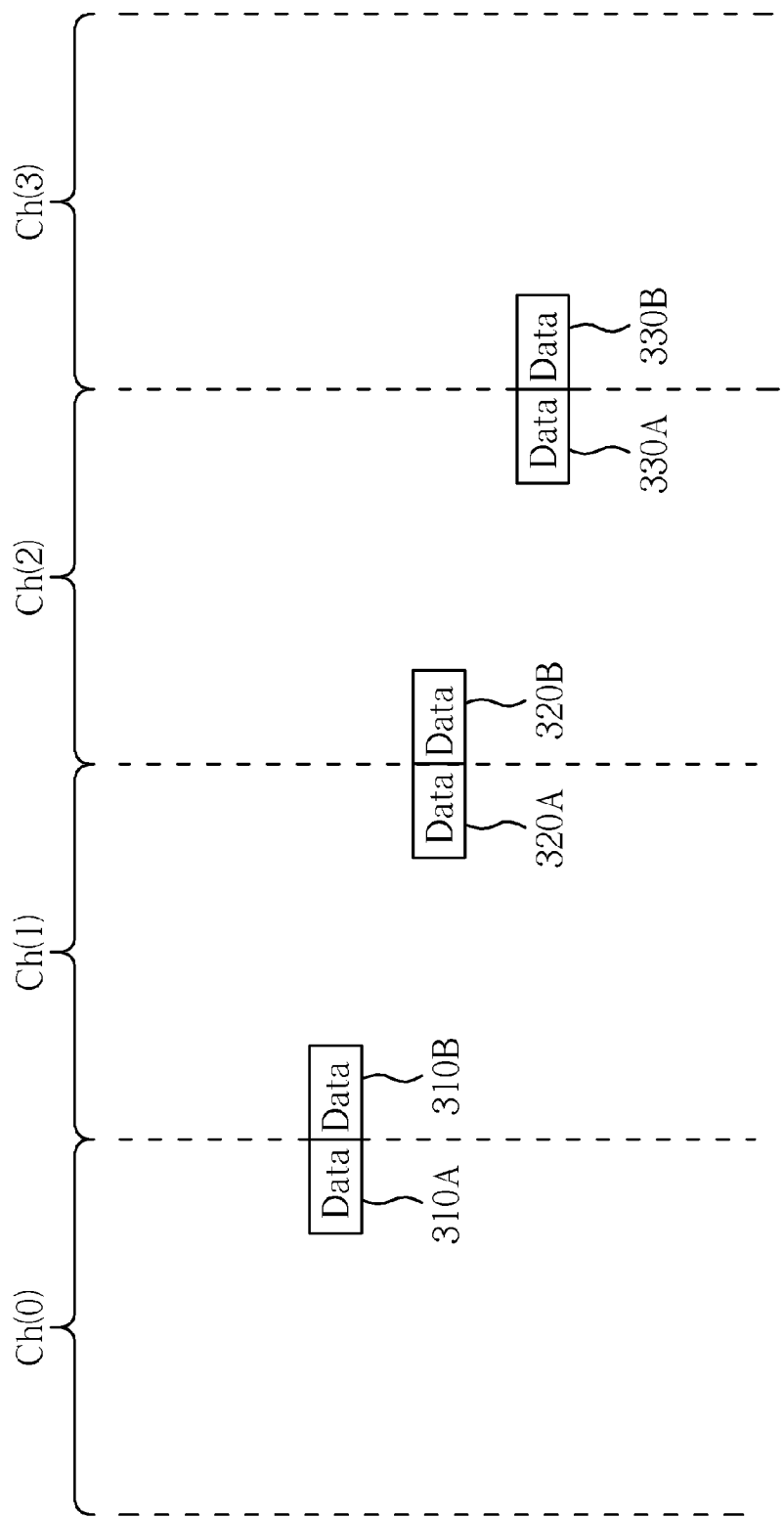

METHOD FOR PERFORMING BLOCK MANAGEMENT, AND ASSOCIATED MEMORY DEVICE AND CONTROLLER THEREOF

BACKGROUND OF THE INVENTION

1. Field of the Invention

The present invention relates to access to a Flash memory having multiple channels, and more particularly, to a method for performing block management, and to an associated memory device and a controller thereof.

2. Description of the Prior Art

As technologies of Flash memories progress in recent years, many kinds of portable memory devices (e.g. memory cards respectively complying with SD/MMC, CF, MS, and XD standards) or solid state drives (SSDs) equipped with Flash memories are widely implemented in various applications. Therefore, the control of access to Flash memories in these memory devices has become an important issue.

Taking NAND Flash memories as an example, they can mainly be divided into two types, i.e. Single Level Cell (SLC) Flash memories and Multiple Level Cell (MLC) Flash memories. Each transistor that is considered a memory cell in SLC Flash memories only has two charge levels that respectively represent a logical value 0 and a logical value 1. In addition, the storage capability of each transistor that is considered a memory cell in MLC Flash memories can be fully utilized. More specifically, the voltage for driving memory cells in the MLC Flash memories is typically higher than that in the SLC Flash memories, and different voltage levels can be applied to the memory cells in the MLC Flash memories in order to record information of at least two bits (e.g. binary values 00, 01, 11, or 10) in a transistor that is considered a memory cell. Theoretically, the storage density of the MLC Flash memories may reach twice the storage density of the SLC Flash memories, which is considered good news for NAND Flash memory manufacturers who encountered a bottleneck of NAND Flash technologies.

As MLC Flash memories are cheaper than SLC Flash memories, and are capable of providing higher capacity than SLC Flash memories while the space is limited, MLC Flash memories have been a main stream for implementation of most portable memory devices on the market. However, various problems of the MLC Flash memories have arisen due to their unstable characteristics. In order to ensure that the access control of a memory device over the Flash memory therein can comply with related standards, the controller of the Flash memory should have some handling mechanisms in order to properly handle its data access operations.

According to the related art, the memory device having the aforementioned handling mechanisms may still suffer from some deficiencies. For example, the handling mechanisms of the related art cannot ensure the channel bandwidth of the respective channels within a Flash memory having multiple channels. In another example, the performance of the related art architecture is poor during sequential reading operations that are performed after random writing operations are performed. Therefore, a novel method is required for performing block management in order to enhance the performance of access to the Flash memory.

SUMMARY OF THE INVENTION

It is therefore an objective of the claimed invention to provide a method for performing block management, and to provide an associated memory device and a controller thereof, in order to solve the above-mentioned problems.

It is another objective of the claimed invention to provide a method for performing block management, and to provide an associated memory device and a controller thereof, in order to enhance the performance of access to the Flash memory.

According to a preferred embodiment of the claimed invention, a method for performing block management is provided. The method is applied to a controller of a Flash memory having multiple channels, wherein the Flash memory comprises a plurality of blocks respectively corresponding to the channels. The method comprises: obtaining at least one portion of a plurality of address-to-channel mapping relationships, for use of writing/programming operations; and according to at least one address-to-channel mapping relationship of the plurality of address-to-channel mapping relationships, programming at least one page of data into the Flash memory through at least one channel in a page mode.

While the method mentioned above is disclosed, an associated memory device is further provided. The memory device comprises: a Flash memory having multiple channels, wherein the Flash memory comprises a plurality of blocks respectively corresponding to the channels; and a controller arranged to access the Flash memory and manage the plurality of blocks. In addition, the controller obtains at least one portion of a plurality of address-to-channel mapping relationships, for use of writing/programming operations. Additionally, according to at least one address-to-channel mapping relationship of the plurality of address-to-channel mapping relationships, the controller programs at least one page of data into the Flash memory through at least one channel in a page mode.

While the method mentioned above is disclosed, a controller of a memory device is further provided. The controller is utilized for accessing a Flash memory having multiple channels, wherein the Flash memory comprises a plurality of blocks respectively corresponding to the channels. The controller comprises: a read only memory (ROM) arranged to store a program code; and a microprocessor arranged to execute the program code to control the access to the Flash memory and manage the plurality of blocks. In addition, the controller that executes the program code by utilizing the microprocessor obtains at least one portion of a plurality of address-to-channel mapping relationships, for use of writing/programming operations. Additionally, according to at least one address-to-channel mapping relationship of the plurality of address-to-channel mapping relationships, the controller that executes the program code by utilizing the microprocessor programs at least one page of data into the Flash memory through at least one channel in a page mode.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 1B illustrates memory sector distribution of Flash memory chips on respective channels within the memory device shown in FIG. 1A according to an embodiment of the present invention.

FIG. 1C illustrates some mapping relationships between logical addresses and channels within the memory device shown in FIG. 1A according to an embodiment of the present invention.

FIGS. 3A-3B illustrate some implementation details of the method shown in FIG. 2 according to an embodiment of the present invention.

FIGS. 5A-5B illustrate some implementation details of the method shown in FIG. 2 according to another embodiment of the present invention.

DETAILED DESCRIPTION

Figure 1A:
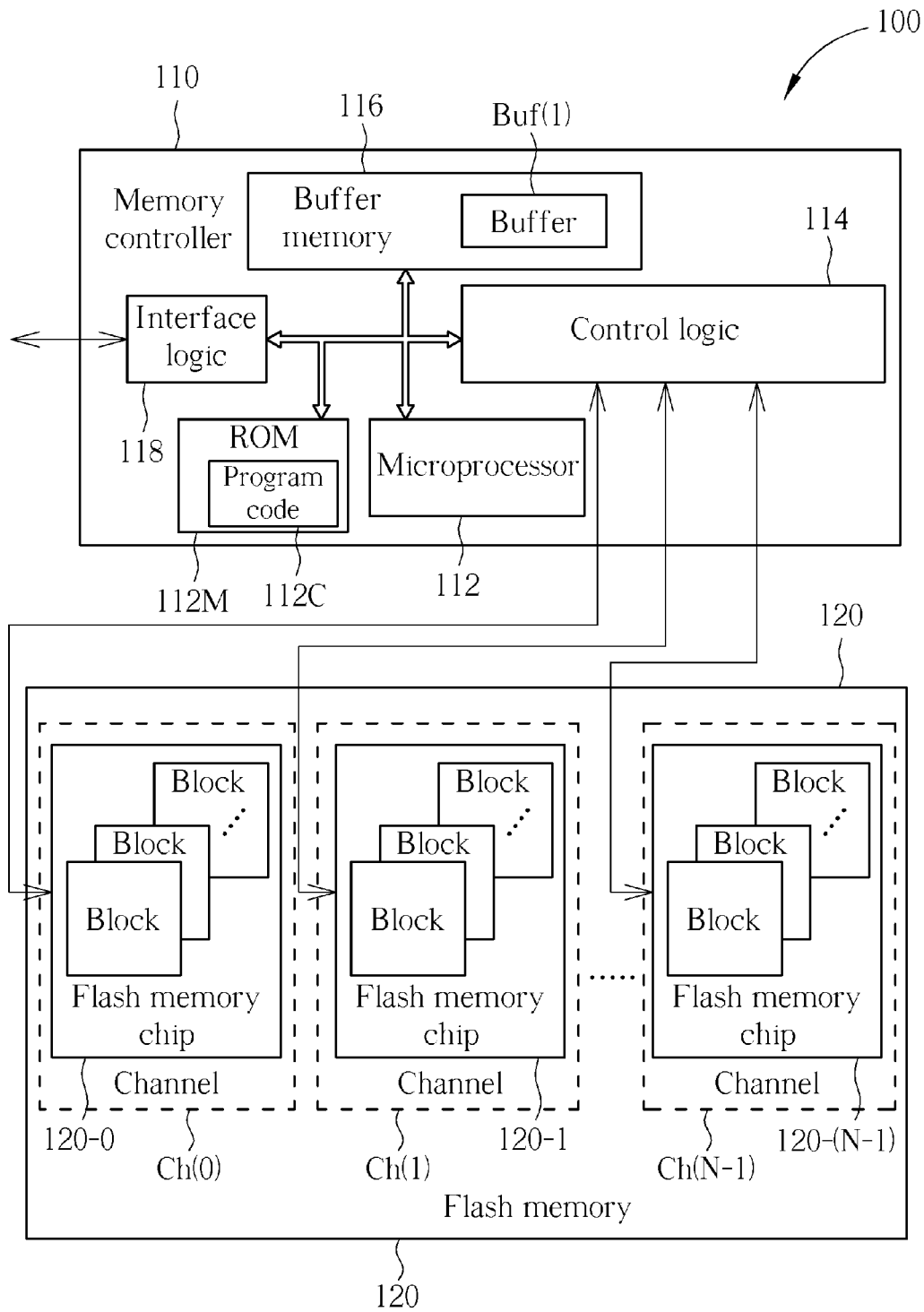
FIG. 1A is a diagram of a memory device according to a first embodiment of the present invention.

Please refer to FIG. 1A, which illustrates a diagram of a memory device 100 according to a first embodiment of the present invention. In particular, the memory device 100 of this embodiment can be a portable memory device, examples of which may include, but not limited to, memory cards complying with SD/MMC, CF, MS, or XD standards. Here, the portable memory device is taken as an example of the memory device 100 in this embodiment. This is for illustrative purposes only, and is not meant to be a limitation of the present invention. According to a variation of this embodiment, the memory device 100 can be a solid state drive (SSD). Referring to FIG. 1A, the memory device 100 comprises a Flash memory 120, and further comprises a controller arranged to access the Flash memory 120, where the aforementioned controller of this embodiment is a memory controller 110. According to this embodiment, the memory controller 110 comprises a microprocessor 112, a read only memory (ROM) 112M, a control logic 114, at least one buffer memory 116, and an interface logic 118. In addition, the ROM 112M is arranged to store a program code 112C, and the microprocessor 112 is arranged to execute the program code 112C to control the access to the Flash memory 120. Please note that the program code 112C can be stored in the buffer memory 116 or any of various kinds of memories according to variations of this embodiment. Additionally, the buffer memory 116 comprises a buffer Buf(1). For example, the buffer Buf(1) can be a buffering region of a plurality of buffering regions within the buffer memory 116. In another example, the aforementioned at least one buffer memory 116 comprises a plurality of buffer memories, one of which can be utilized for implementing the buffer Buf(1).

As shown in FIG. 1A, the aforementioned Flash memory 120 comprises a plurality of Flash memory chips such as the Flash memory chips 120-0, 120-1, ..., and 120-(N−1), where the Flash memory 120 has multiple channels, such as the channels Ch(0), Ch(1), ..., and Ch(N−1), and the Flash memory chips such as the Flash memory chips 120-0, 120-1, ..., and 120-(N−1) respectively belong to the channels. Typically, the Flash memory 120 comprises a plurality of blocks respectively corresponding to the channels, and when the controller (e.g. the memory controller 110 that executes the program code 112C by utilizing the microprocessor 112) performs data erasure operations on the Flash memory chips, the minimum erasure unit can be a block. In addition, a block can be utilized for recording a specific amount of pages, and when the controller performs data writing operations on any of the Flash memory chips, the minimum writing unit can be a page. Additionally, a physical page may comprise a plurality of sectors, such as eight sectors.

In practice, the memory controller 110 that executes the program code 112C by utilizing the microprocessor 112 is capable of performing various control operations by utilizing the internal components within the memory controller 110. For example, the memory controller 110 utilizes the control logic 114 to control access to each Flash memory chip (e.g. operations of accessing at least one block or at least one page), utilizes the buffer memory 116 to perform buffering operations for the memory controller 110, and utilizes the interface logic 118 to communicate with a host device.

According to this embodiment, in addition to accessing the Flash memory 120, the memory controller 110 is capable of properly managing the plurality of blocks mentioned above. FIG. 1B illustrates memory sector distribution of the Flash memory chips on the respective channels within the memory device 100 shown in FIG. 1A according to an embodiment of the present invention. FIG. 1C illustrates some mapping relationships between logical addresses and the channels within the memory device 100 shown in FIG. 1A according to an embodiment of the present invention. According to this embodiment, the controller can operate in a page mode, and in this situation, no matter where the logical addresses of the data that the host device instructs the memory device 100 to write/program distribute within the range of all possible logical addresses, based upon the arrangement shown in FIG. 1C, the controller can achieve high performance during sequential reading operations that are performed after random writing operations are performed. More particularly, in a situation where the controller operates in the page mode, the controller can write/program data of logical addresses of discontinuous (or random) distribution into the same physical block page by page, and can also write/program different versions of update data that belong to the same page into a plurality of physical pages of one or more physical blocks page by page, and further record information regarding which of the physical pages stores the latest version of update data. The logical addresses of the data respectively stored in any two physical pages of the same physical block may differ greatly, and the difference between these logical addresses may be greater than the number of physical pages within a physical block. For example, in a situation where a certain physical block comprises 256 physical pages, for the stored data of a physical page in the physical block, the logical page address thereof may be 0x0000, and for the stored data of another physical page in the physical block, the logical page address thereof may be 0x2000, where the difference between the two logical page addresses is greater than 256. As shown in FIG. 1C, given that the notation "m" represents a non-negative integer, the logical page addresses 0x0000, 0x0004, 0x0008 ... 0x(4 m) ... map to the Flash memory chip 120-0 on the channel Ch(0), and the data belonging to the aforementioned logical addresses should be stored into the Flash memory chip 120-0 on the channel Ch(0). The logical page addresses 0x0001, 0x0005, 0x0009 ... 0x(4 m+1) ... map to the Flash memory chip 120-1 on the channel Ch(1), and the data belonging to the aforementioned logical addresses should be stored into the Flash memory chip 120-1 on the channel Ch(1). The logical page addresses 0x0002, 0x0006, 0x0010 ... 0x(4 m+2) ... map to the Flash memory chip 120-2 on the channel Ch(2), and the data belonging to the aforementioned logical addresses should be stored into the Flash memory chip 120-2 on the channel Ch(2). The logical page addresses 0x0003, 0x0007, 0x0011 ... 0x(4 m+3) ... map to the Flash memory chip 120-3 no the channel Ch(3), and the data belonging to the aforementioned logical addresses should be stored into the Flash memory chip 120-3 on the channel Ch(3). In other words, on a single Flash memory chip of the Flash memory chips, the difference between the logical page addresses mapped by any two physical pages is a multiple of the total number of channels within the memory device. For example, the host device sends a first write command to the memory device 100, in order to instruct the memory device 100 to write/program the data $D_0$ of the logical page address 0x0000. When receiving the first write command, the memory controller 110 writes/programs the data $D_0$ into a blank memory page (e.g. a first physical memory page) in a physical block (e.g. a first physical block) of the Flash memory chip 120-0 on the channel Ch(0). Afterward, the host device sends a second write command to the memory device 100, in order to instruct the memory device 100 to write/program the data $D_{2000}$ of the logical page address 0x2000. When receiving the second write command, the memory controller 110 writes/programs the data $D_{2000}$ into another blank memory page (e.g. a second physical memory page) in the first physical block of the Flash memory chip 120-0 on the channel Ch(0). The difference between the logical page addresses 0x0000 and 0x2000 is a multiple of the channel count (which is four in this embodiment). In other words, the difference between the logical page addresses on the same channel is related to the channel count. Additionally, the first physical memory page and the second physical memory page are adjacent physical memory pages, and with regard to the distribution of physical memory pages, the second physical memory page is next to the first physical memory page.

In the table shown in FIG. 1B, each row represents a set of physical pages respectively corresponding to the respective channels Ch(0), Ch(1), . . . , and Ch(N−1), and the values shown in FIG. 1B, such as the indexes 0, 1, . . . , 63, . . . , etc., may represent sector numbers, such as physical sector addresses. As shown in FIG. 1B, in this embodiment, each physical page comprises eight physical sectors. According to this embodiment, the physical sectors {0, 1, . . . , 7} having the physical sector addresses {0, 1, . . . , 7} belong to a physical page in the channel Ch(0), the physical sectors {8, 9, . . . , 15} having the physical sector addresses {8, 9, . . . , 15} belong to a corresponding physical page in the channel Ch(1), the physical sectors {16, 17, . . . , 23} having the physical sector addresses {16, 17, . . . , 23} belong to a corresponding physical page in the channel Ch(2), the physical sectors {24, 25, . . . , 31} having the physical sector addresses {24, 25, . . . , 31} belong to a corresponding physical page in the channel Ch(3), and the rest may be deduced by analogy. This is for illustrative purposes only, and is not meant to be a limitation of the present invention. According to some variations of this embodiment, the aforementioned number N (i.e. the channel count in this embodiment) can be a positive integer that is greater than one. According to some variations of this embodiment, the relationships between physical sector numbers (or physical sector addresses) and channels may vary. According to some variations of this embodiment, the number of sectors within each physical page may vary.

Figure 2:
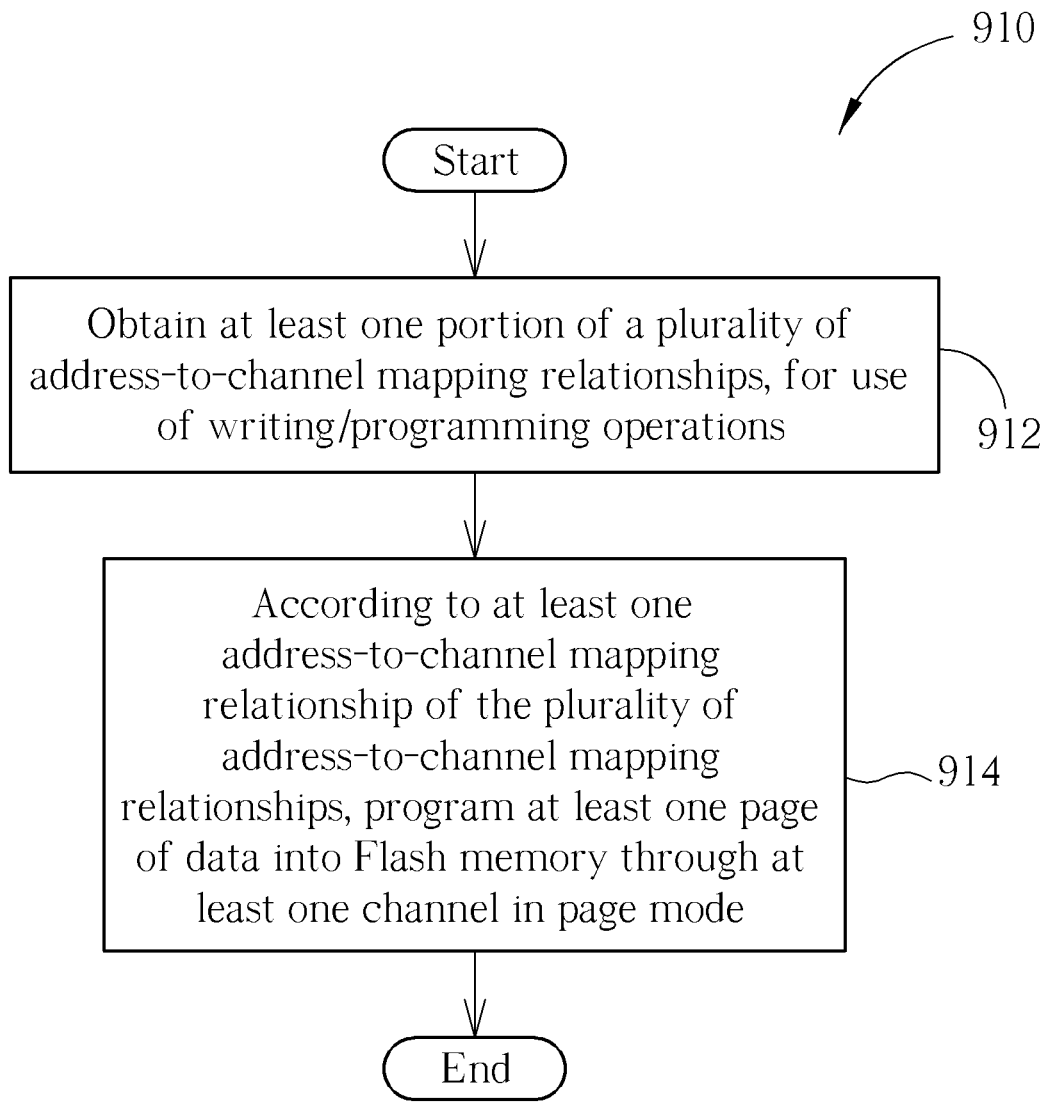
FIG. 2 is a flowchart of a method for performing block management according to an embodiment of the present invention.

Based upon the sector arrangement corresponding to the channels, such as the sector arrangement shown in FIG. 1B, the present invention can properly manage the respective physical blocks of the Flash memory 120 having multiple channels, in order to enhance the performance of access to the Flash memory 120. Referring to FIG. 2, related details regarding the block management performed by the controller are further described as follows.

FIG. 2 is a flowchart of a method 910 for performing block management according to an embodiment of the present invention. The method can be applied to the memory device 100 in any of the respective embodiments shown in FIGS. 1A-1C (and associated variations), and more particularly, the controller of the Flash memory 120 having multiple channels, such as the aforementioned controller (e.g. the memory controller 110 that executes the program code 112C by utilizing the microprocessor 112). The method is described as follows.

In Step 912, the controller obtains at least one portion (e.g. a portion or all) of a plurality of address-to-channel mapping relationships, such as a plurality of logical address (e.g. logical sector address, or logical page address)-to-channel mapping relationships, for use of writing/programming operations. According to this embodiment, the logical address-to-channel mapping relationships can be logical sector address-to-channel mapping relationships.

In Step 914, according to at least one address-to-channel mapping relationship of the plurality of address-to-channel mapping relationships such as the plurality of logical address (e.g. logical sector addresses, or logical page addresses)-to-channel mapping relationships, the controller programs at least one page of data into the Flash memory 120 through at least one channel in the page mode. For example, in a situation where the logical address-to-channel mapping relationships are a plurality of logical sector address-to-channel mapping relationships, according to at least one logical sector address-to-channel mapping relationship of the plurality of logical sector address-to-channel mapping relationships, the controller writes/programs at least one page of data into the Flash memory 120 through at least one channel in the page mode.

In practice, the controller can perform calculations according to a predetermined rule, in order to obtain the aforementioned at least one portion of the logical address-to-channel mapping relationships. For example, the controller can perform calculations regarding the logical page addresses, and more particularly, can divide the logical page address 0x0000 by the channel count (which is four in this embodiment) and obtain the remainder 0 and therefore determine that the data corresponding to the logical page address 0x0000 should be stored in the channel 0 such as the channel CH(0) mentioned above, and can further divide the logical page address 0x0001 by the channel count (which is four in this embodiment) and obtain the remainder 1 and therefore determine that the data corresponding to the logical page address 0x0001 should be stored in the channel 1 such as the channel CH(1) mentioned above, where these are examples of the address-to-channel mapping relationships. After obtaining the teachings of the present invention, those skilled in the art will appreciate that some other logical addresses (e.g. logical page addresses, or logical sector addresses) may correspond to some other logical channels, respectively.

This is for illustrative purposes only, and is not meant to be a limitation of the present invention. According to some variations of this embodiment, a certain storage of the memory device 100 stores the aforementioned at least one portion of the address-to-channel mapping relationships, where the storage can be a certain storage within the controller, such as the ROM 112M, the buffer memory 116, or any types of memories within the controller, or can be the Flash memory 120. In addition, the controller can read at least one address-to-channel mapping relationship of the aforementioned at least one portion of the address-to-channel mapping relationships, such as the at least one address-to-channel mapping relationship mentioned in Step 914, from the storage.

According to this embodiment, given that the notation "x" represents the logical sector addresses (e.g. x=0, 1, . . . , etc.) and the notation "n" represents the index of a channel Ch(n)

(e.g. n=0, 1, ..., (N−1)), the logical sector address-to-channel mapping relationships can be expressed as follows:

$$n=(x>>X_{PD})\%N;$$

where the notation ">>" represents the operator of bit-shifting and the notation "%" represents the operator of a Modulo operation, and the notation "$X_{PD}$" represents a predetermined value. Thus, in this embodiment, the index n of the channel Ch(n) can be obtained from the following operations of: bit-shifting a specific logical sector address such as the logical sector address x to the right by a predetermined number of bits, and more particularly, bit-shifting the logical sector address x to the right by $X_{PD}$ bits, in order to generate a shifted result, where the predetermined value $X_{PD}$ represents the predetermined number; and dividing the shifted result by a predetermined divisor such as N to calculate the remainder thereof, and utilizing the remainder as the index n of the channel Ch(n). For example, FIG. 1C illustrates a situation where the number N is equal to four and the predetermined number $X_{PD}$ is equal to three. In other words, the operations disclosed above can be regarded as a method comprising the steps of: utilizing the logical sector address to calculate the logical page address to which the logical sector address belongs, and dividing the logical page address by the channel count to calculate the remainder thereof, where the remainder is the index of the channel. Please note that the method of calculating the logical sector address by bit-shifting the logical sector address x to the right by $X_{PD}$ bits is suitable for implementing in a situation where the logical sector address is expressed in binary form. This is for illustrative purposes only, and is not meant to be a limitation of the present invention. After obtaining the teachings of the present invention, those skilled in the art may deduce some calculation methods for implementing in a situation where the logical sector address is expressed in some other form.

FIGS. 3A-3B illustrate some implementation details of the method 910 shown in FIG. 2 according to an embodiment of the present invention. As shown in FIG. 3A, the data 310 represents the data to be written/programmed based upon a write command such as the command CMD($k_{11}$), where the data 310 is the data of some sectors (e.g. the sectors 4, 5, 6, and 7) of a logical page belonging to the channel Ch(0), and has a data amount that is less than a page. Based upon the operation of Step 912, the controller determines that the logical sector address x involved with the data 310 (i.e. the logical sector addresses 4, 5, 6, and 7 in this embodiment) merely corresponds to the channel Ch(0), so when performing a writing/programming operation of the data 310, the controller can perform other operations in the other channels such as the channels Ch(1), Ch(2), and Ch(3). Thus, in a situation where the at least one channel mentioned in Step 914 does not comprise all channels of the channels Ch(0), Ch(1), Ch(2) and Ch(3), the controller programs the aforementioned at least one page of data into the Flash memory 120 through the aforementioned at least one channel, rather than re-writing/re-programming any old data with regard to the corresponding logical pages in the other channels (e.g. Ch(1), Ch(2), and Ch(3)) within the channels Ch(0), Ch(1), Ch(2) and Ch(3). That is, the controller does not re-write/re-program any old data with regard to the corresponding logical pages in the other channels (e.g. Ch(1), Ch(2), and Ch(3)) within the channels Ch(0), Ch(1), Ch(2) and Ch(3) in this situation.

As shown in FIG. 3B, as the data 310 does not occupy the whole of the logical page to which the data 310 belongs, i.e. this logical page will be partially updated, the controller finds and obtains the other portion of data of this logical page, such as the data 312, and more particularly, the latest data before update (which is illustrated with the shaded portion, for better comprehension). As a result, in Step 914, according to the mapping relationships that the logical sector addresses 4, 5, 6, and 7 correspond to the channel Ch(0), the controller writes/programs this page of data (i.e. the data 310 and 312) into the Flash memory 120 through at least one channel such as the channel Ch(0) in the page mode.

In practice, the controller can temporarily store the data 310 and 312 into at least one buffer of the controller, such as the buffer Buf(1). The controller can analyze the command CMD($k_{21}$), in order to determine whether to perform the writing operation shown in FIG. 3B. As a result, the controller temporarily stores the data 310 and 312 that are temporarily stored in the buffer Buf(1) into the Flash memory 120 through the channel Ch(0). Please note that temporarily storing the data 310 will not take too much time since the speed that the host device transmits data is typically very fast in comparison with the writing/programming operations performed on the Flash memory 120.

Figure 4A:
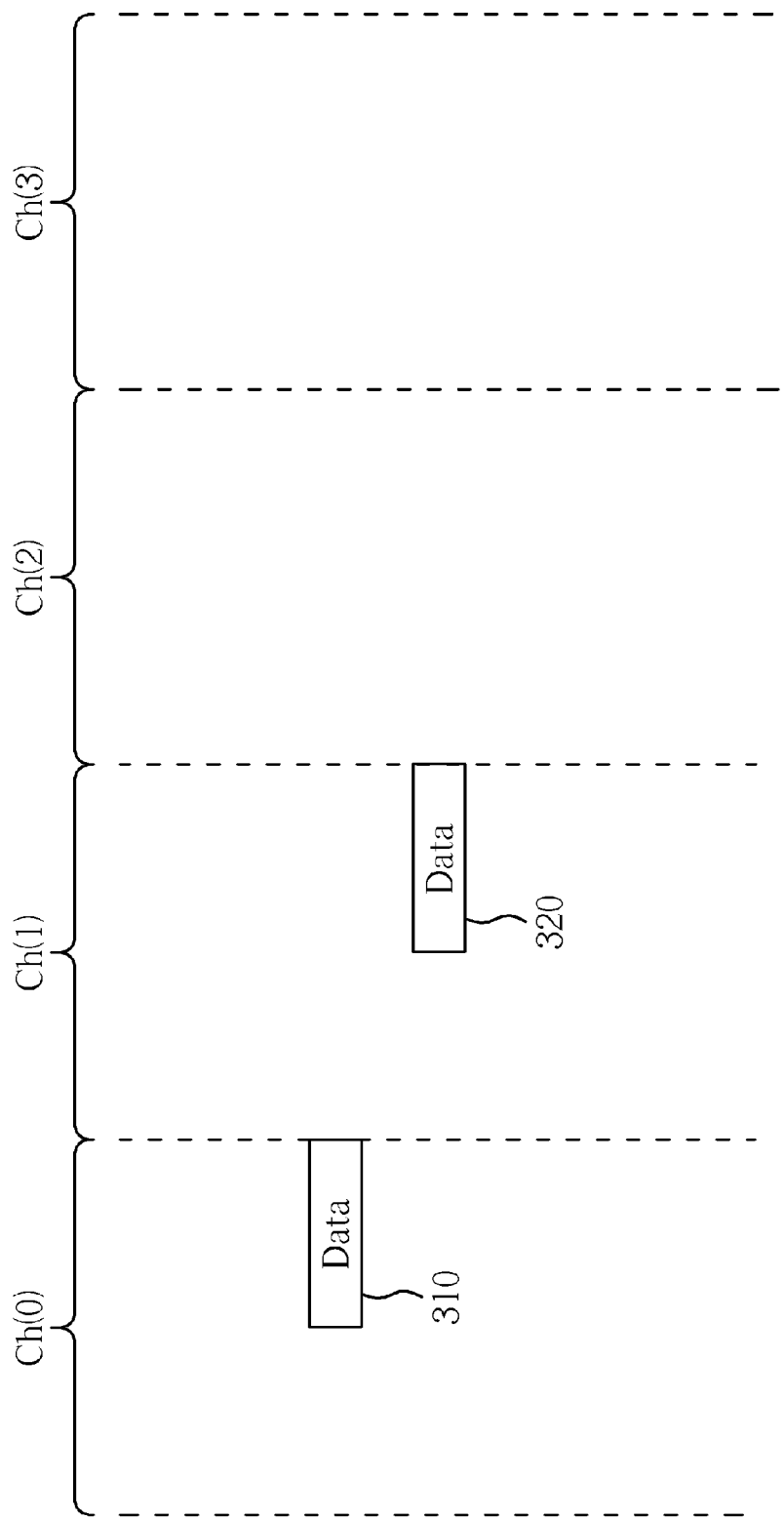
FIGS. 4A-4B illustrate some implementation details of the method shown in FIG. 2 according to another embodiment of the present invention.
Figure 4B:
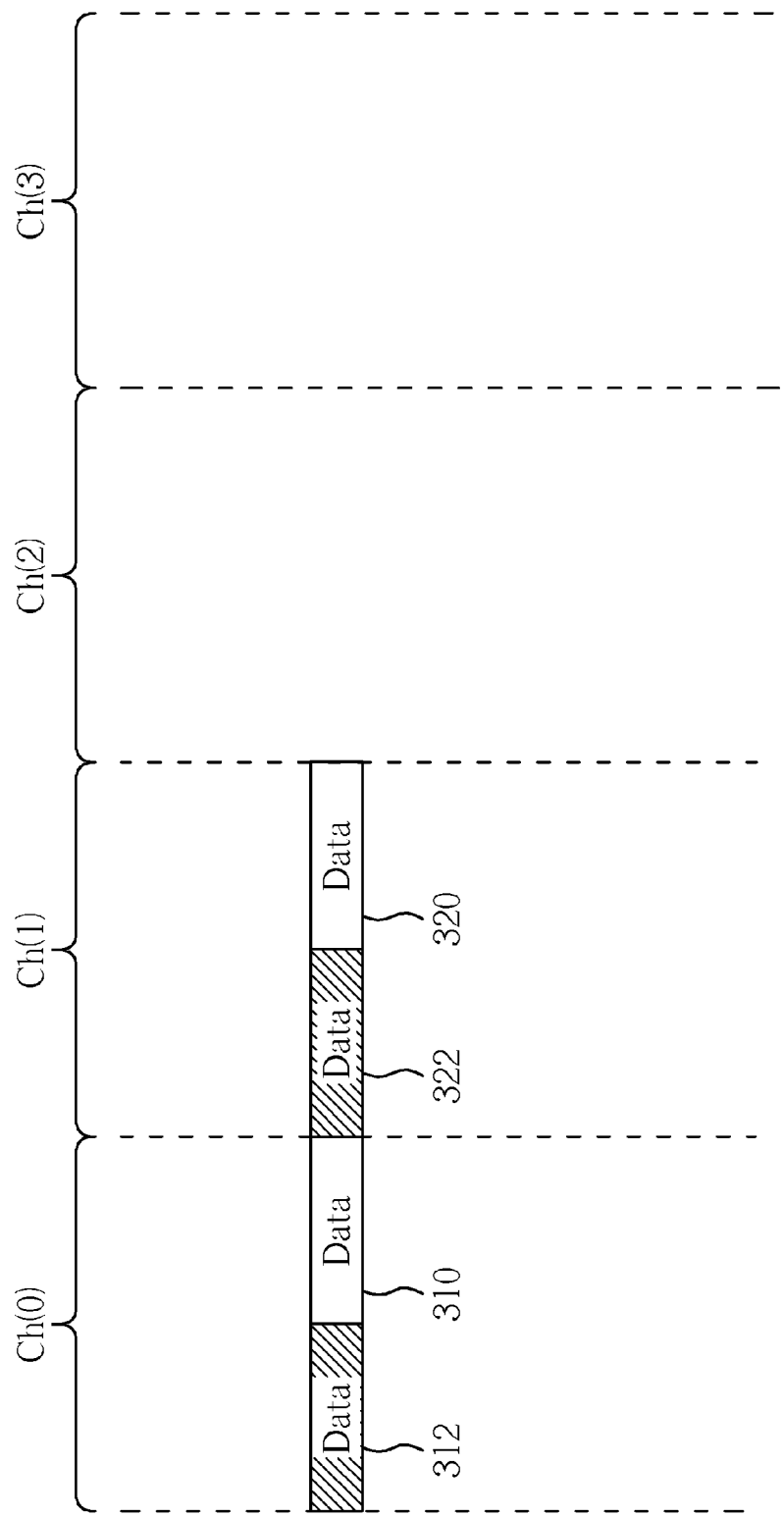

FIGS. 4A-4B illustrate some implementation details of the method 910 shown in FIG. 2 according to another embodiment of the present invention. As shown in FIG. 4A, the data 310 and 320 respectively represent the data to be written/programmed based upon some write commands such as the commands CMD($k_{21}$) and CMD($k_{22}$), where the data 310 of this embodiment is the same as the data 310 of the embodiment shown in FIG. 3A, and the data 320 is the data of some sectors (e.g. the sectors 12, 13, 14, and 15) of a logical page belonging to the channel Ch(1), and has a data amount that is less than a page. Based upon the operation of Step 912, the controller determines that the logical sector address x involved with the data 310 (i.e. the logical sector addresses 4, 5, 6, and 7 in this embodiment) merely corresponds to the channel Ch(0), and determines that the logical sector address x involved with the data 320 (i.e. the logical sector addresses 12, 13, 14, and 15 in this embodiment) merely corresponds to the channel Ch(1), so when performing a writing/programming operation of the data 310, the controller can perform other operations in the other channels such as the channels Ch(2) and Ch(3). Thus, in a situation where the at least one channel mentioned in Step 914 does not comprise all channels of the channels Ch(0), Ch(1), Ch(2) and Ch(3), the controller programs the aforementioned at least one page of data into the Flash memory 120 through the aforementioned at least one channel, rather than re-writing/re-programming any old data with regard to the corresponding logical pages in the other channels (e.g. Ch(2) and Ch(3)) within the channels Ch(0), Ch(1), Ch(2) and Ch(3). That is, the controller does not re-write/re-program any old data with regard to the corresponding logical pages in the other channels (e.g. Ch(2) and Ch(3)) within the channels Ch(0), Ch(1), Ch(2) and Ch(3) in this situation.

As mentioned, the controller can find and obtain the data 312. Similarly, as the data 320 does not occupy the whole of the logical page to which the data 320 belongs, the controller finds and obtains the other portion of data of this logical page, such as the data 322. Please refer to FIG. 4B for further details. As a result, in Step 914, according to the mapping relationships that the logical sector addresses 4, 5, 6, and 7 correspond to the channel Ch(0) and the mapping relationships that the logical sector addresses 12, 13, 14, and 15 correspond to the channel Ch(1), the controller respectively writes/programs these two pages of data (i.e. the data 310 and 312 and the data 320 and 322) into the Flash memory 120 through at least one channel such as the channels Ch(0) and Ch(1) in the page mode.

In this embodiment, the controller first receives the command CMD($k_{21}$) and then receives the command CMD($k_{22}$) from the host device. In practice, the controller can temporarily store the data 310, 312, 320, and 322 into at least one buffer of the controller, such as the buffer Buf(1). The controller can analyze the commands CMD($k_{21}$) and CMD($k_{22}$), in order to determine whether to perform the writing operation shown in FIG. 4B. As a result, the controller writes/programs the data 310, 312, 320, and 322 that are temporarily stored in the buffer Buf(1) into the Flash memory 120 through the channels Ch(0) and Ch(1) at the same time.

Please note that temporarily storing the data 310 and 320 will not take too much time since the speed that the host device transmits data is typically very fast in comparison with the writing/programming operations performed on the Flash memory 120. In addition, as each of the data 310, 312, 320, and 322 can be regarded as partial data within the same set of data when the controller writes/programs the data 310 and 320, this embodiment can reduce the total number of times of writing/programming the Flash memory 120. Therefore, in contrast to the related art, the present invention can save the time of performing writing operations on the Flash memory 120. Based upon the arrangement shown in FIG. 1C, the present invention can achieve high performance during sequential reading operations that are performed after random writing operations are performed.

According to a variation of this embodiment, the data 310 is replaced by the data 310', where the data 310' is the data of all of the sectors of a logical page belonging to the channel Ch(1). For example, the data 310' comprises the data D8, D9, D10, D11, D12, D13, D14, and D15 respectively belonging to the sectors 8, 9, 10, 11, 12, 13, 14, and 15, and the data 320 comprises the data D12', D13', D14', and D15' respectively belonging to the sectors 12, 13, 14, and 15. As the controller first receives the command CMD($k_{21}$) and then receives the command CMD($k_{22}$) from the host device, the controller can analyze the commands CMD($k_{21}$) and CMD($k_{22}$), and therefore determine that the data D8, D9, D10, D11, D12', D13', D14', and D15' are the latest data respectively belonging to the sectors 8, 9, 10, 11, 12, 13, 14, and 15. In practice, the controller can temporarily store the data D8, D9, D10, D11, D12', D13', D14', and D15' into at least one buffer of the controller, such as the buffer Buf(1), having no need to temporarily store the data D12, D13, D14, and D15. As a result, the controller temporarily stores the data D8, D9, D10, D11, D12', D13', D14', and D15' that are temporarily stored in the buffer Buf(1) into the Flash memory 120 through the channel Ch(1).

Please note that temporarily storing the data D8, D9, D10, D11, D12', D13', D14', and D15' will not take too much time since the speed that the host device transmits data is typically very fast in comparison with the writing/programming operations performed on the Flash memory 120. In addition, as the controller merely writes/programs the latest data D8, D9, D10, D11, D12', D13', D14', and D15' respectively belonging to the sectors 8, 9, 10, 11, 12, 13, 14, and 15 into the Flash memory 120, this variation can reduce the total number of times of writing/programming the Flash memory 120. Therefore, in contrast to the related art, the present invention can save the time of performing writing operations on the Flash memory 120.

Figure 5B:
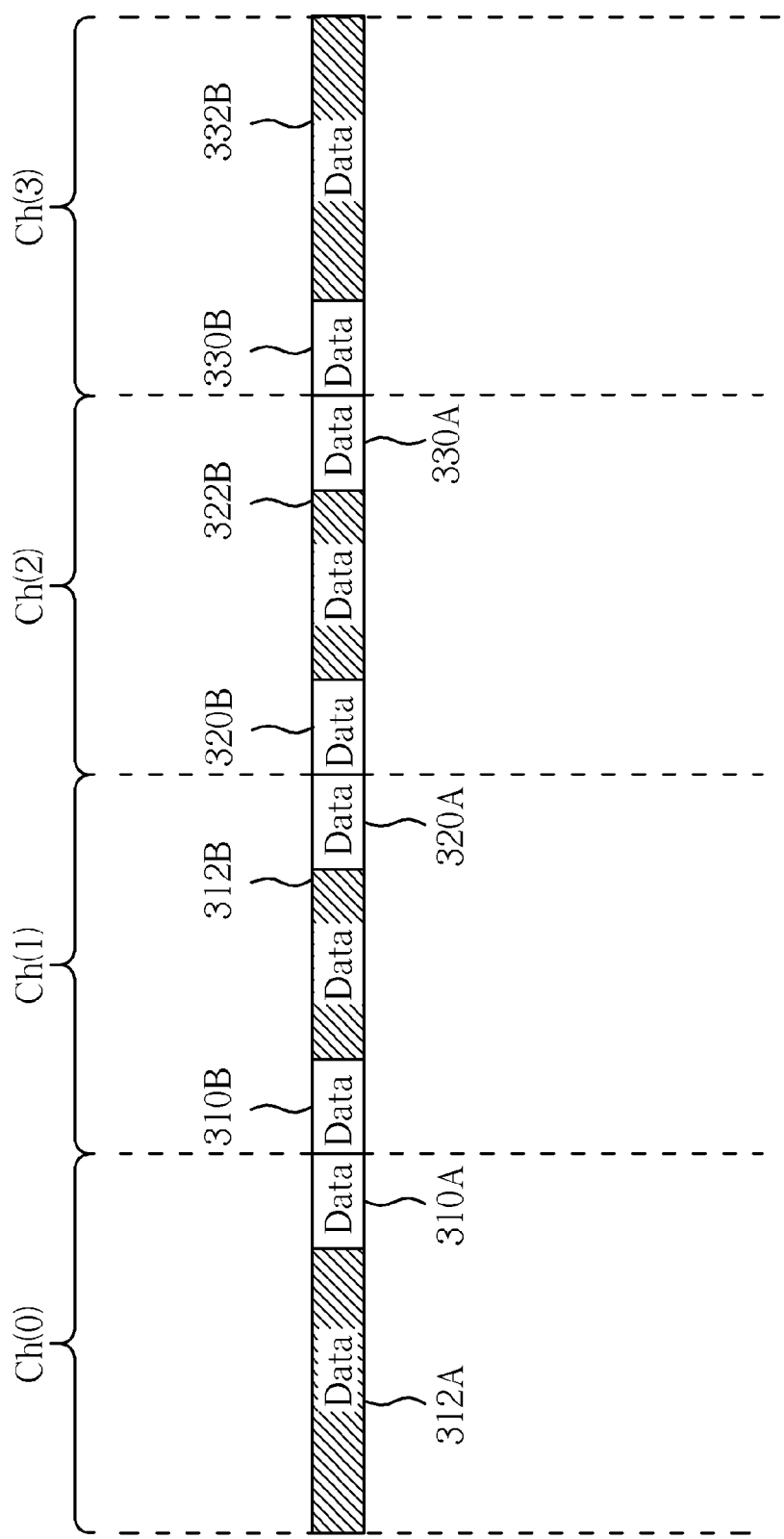

FIGS. 5A-5B illustrate some implementation details of the method 910 shown in FIG. 2 according to another embodiment of the present invention. As shown in FIG. 5A, the data {310A, 310B}, {320A, 320B}, and {330A, 330B} respectively represent the data to be written/programmed based upon some write commands such as the commands CMD($k_{31}$), CMD($k_{32}$), and CMD($k_{33}$). In this embodiment, the data 310A is the data of some sectors (e.g. the sectors 38 and 39) of a logical page belonging to the channel Ch(0), and the data 310B is the data of some sectors (e.g. the sectors 40 and 41) of a logical page belonging to the channel Ch(1). In addition, the data 320A is the data of some sectors (e.g. the sectors 46 and 47) of a logical page belonging to the channel Ch(1), and the data 320B is the data of some sectors (e.g. the sectors 48 and 49) of a logical page belonging to the channel Ch(2). Additionally, the data 330A is the data of some sectors (e.g. the sectors 54 and 55) of a logical page belonging to the channel Ch(2), and the data 330B is the data of some sectors (e.g. the sectors 56 and 57) of a logical page belonging to the channel Ch(3). Please note that any of the data 310A, 310B, 320A, 320B, 330A, and 330B has a data amount that is less than a page. Based upon the operation of Step 912, the controller determines that the logical sector address x involved with the data 310A (i.e. the logical sector addresses 38 and 39 in this embodiment) corresponds to the channel Ch(0), and determines that the logical sector address x involved with the data 310B and 320A (i.e. the logical sector addresses 40, 41, 46, and 47 in this embodiment) corresponds to the channel Ch(1), and determines that the logical sector address x involved with the data 320B and 330A (i.e. the logical sector addresses 48, 49, 54, and 55 in this embodiment) corresponds to the channel Ch(2), and determines that the logical sector address x involved with the data 330B (i.e. the logical sector addresses 56 and 57 in this embodiment) corresponds to the channel Ch(3), so the controller can perform writing/programming operations in all channels such as the channel Ch(0), Ch(1), Ch(2) and Ch(3) at the same time.

Similarly, as the data 310A, 310B, 320A, 320B, 330A, and 330B do not occupy the whole of the respective logical pages to which the data respectively belong (i.e. any data set of the data sets {310A}, {310B, 320A}, {320B, 330A}, and {330B} does not occupy the whole of the logical page to which the data set under consideration belongs), the controller finds and obtains the other portions of the data in these logical pages, such as the data 312A, 312B, 322B, and 332B. In this embodiment, as the controller can determine that any two of the data 310A, 310B, 320A, 330A, and 330B do not overlap with each other according to the order of writing operations represented by the commands CMD($k_{31}$), CMD($k_{32}$), and CMD($k_{33}$), any of the data 310A, 310B, 320A, 320B, 330A, and 330B will not replace another of the data 310A, 310B, 320A, 320B, 330A, and 330B. Please refer to FIG. 5B for further details. As a result, in Step 914, according to the mapping relationships that the logical sector addresses 38 and 39 correspond to the channel Ch(0) and the mapping relationships that the logical sector addresses 40, 41, 46, and 47 correspond to the channel Ch(1), and according to the mapping relationships that the logical sector addresses 48, 49, 54, and 55 correspond to the channel Ch(2) and the mapping relationships that the logical sector addresses 56 and 57 correspond to the channel Ch(3), the controller respectively writes/programs these four pages of data (i.e. the data {310A, 312A}, the data {310B, 312B, 320A}, the data {320B, 322B, 330A}, and the data {330B, 332B}) into the Flash memory 120 through at least one channel such as all of the channels Ch(0), Ch(1), Ch(2) and Ch(3) in the page mode.

In this embodiment, the controller first receives the command CMD($k_{31}$) and then receives the command CMD($k_{32}$) and then receives the command CMD($k_{33}$) from the host device. In practice, the controller can temporarily store the data {310A, 310B}, {320A, 320B}, and {330A, 330B} into at least one buffer of the controller, such as the buffer Buf(1). The controller can analyze the commands CMD($k_{31}$), CMD ($k_{32}$), and CMD($k_{33}$), in order to determine whether to perform the writing operation shown in FIG. 5B.

Please note that temporarily storing the data {310A, 310B}, {320A, 320B}, and {330A, 330B} will not take too much time since the speed that the host device transmits data is typically very fast in comparison with the writing/programming operations performed on the Flash memory 120. In addition, as each of the data 310A, 312A, 310B, 312B, 320A, 320B, 322B, 330A, 330B, and 332B can be regarded as partial data within the same set of data when the controller writes/programs the data {310A, 310B}, {320A, 320B}, and {330A, 330B}, this embodiment can reduce the total number of times of writing/programming the Flash memory 120. Therefore, in contrast to the related art, the present invention can save the time of performing writing operations on the Flash memory 120. Based upon the arrangement shown in FIG. 1C, the present invention can achieve high performance during sequential reading operations that are performed after random writing operations are performed.

It is an advantage of the present invention that the management implemented according to the present invention can enhance the overall channel bandwidth of the Flash memory having multiple channels. In addition, based upon the arrangement corresponding to the channel, such as the arrangement shown in FIG. 1C, the related art problem of excessively utilizing a certain channel is no longer an issue. When the host device is going to write/program data of continuous logical page addresses in a short time, the memory controller of some embodiments of the present invention can distribute the data of the continuous logical page addresses among the Flash memory chips on different channels, and then, when the host device is going to read the data, the memory controller can read the data from the Flash memory chips on different channels in a parallel manner and send the data to the host device in reply to the request from the host device, and therefore, the access speed can be increased significantly. In contrast to the related art, in a situation where the chip area and the associated costs are not greatly increased, the present invention can achieve the goal of giving consideration to both operation performance and system resource management.

Those skilled in the art will readily observe that numerous modifications and alterations of the device and method may be made while retaining the teachings of the invention.

What is claimed is:

1. A method for performing block management, the method being applied to a controller of a Flash memory having multiple channels, the Flash memory comprising a plurality of blocks respectively corresponding to the channels, the method comprising:
    obtaining at least one portion of a plurality of address-to-channel mapping relationships, for use of writing/programming operations; and
    according to at least one address-to-channel mapping relationship of the plurality of address-to-channel mapping relationships, programming at least one page of data into the Flash memory through at least one channel, wherein the controller is arranged to write data of logical addresses of discontinuous distribution into a same physical block of the blocks page by page, and is also arranged to write different versions of update data that belong to a same logical page into a plurality of physical pages of one or more of the blocks page by page, and further record information regarding which of the physical pages stores a latest version of update data;
wherein a first partial data of a specific logical page of the at least one page of data represents partial data to be written based upon a specific write command from a host device, and the step of programming the at least one page of data into the Flash memory through the at least one channel further comprises:
    obtaining non-updated partial data of the specific logical page from the Flash memory; and
    writing the first partial data and the non-updated partial data of the specific logical page into a first physical page of the plurality of physical pages through a specific channel of the channels, wherein the specific logical page belongs to the specific channel, and the first partial data comprises one or more sectors of the specific logical page, and has a data amount which is less than that of one page, wherein the non-updated partial data of the specific logical page comprises at least one other sector of the specific logical page, and has a data amount which is less than that of one page.

2. The method of claim 1, wherein the address-to-channel mapping relationships are logical sector address-to-channel mapping relationships.

3. The method of claim 2, wherein the address-to-channel mapping relationships represent mapping relationships that a plurality of logical sector addresses respectively correspond to the channels.

4. The method of claim 2, wherein the step of obtaining the at least one portion of the plurality of address-to-channel mapping relationships for use of writing/programming operations further comprises:
    bit-shifting a specific logical sector address to the right by a predetermined number of bits, in order to generate a shifted result; and
    dividing the shifted result by a predetermined divisor to calculate a remainder thereof, and utilizing the remainder as an index of a channel.

5. The method of claim 1, wherein the first partial data does not comprise a last sector of the specific logical page.

6. The method of claim 1, wherein the first partial data comprises a last sector of the specific logical page.

7. The method of claim 1, wherein a second partial data of another logical page of the at least one page of data represents other partial data to be written based upon the specific write command; and the step of programming the at least one page of data into the Flash memory through the at least one channel further comprises:
    obtaining non-updated partial data of the other logical page from the Flash memory; and
    writing the second partial data and the non-updated partial data of the other logical page into a second physical page of the plurality of physical pages through another channel of the channels, wherein the other logical page belongs to the other channel, and the second partial data comprises one or more sectors of the other logical page, and has a data amount which is less than that of one page, wherein the non-updated partial data of the other logical page comprises at least one other sector of the other logical page, and has a data amount which is less than that of one page.

8. A memory device, comprising:
    a Flash memory having multiple channels, wherein the Flash memory comprises a plurality of blocks respectively corresponding to the channels; and
    a controller arranged to access the Flash memory and manage the plurality of blocks, wherein the controller obtains at least one portion of a plurality of address-to-channel mapping relationships, for use of writing/programming operations, and according to at least one address-to-channel mapping relationship of the plurality of address-to-channel mapping relationships, the controller programs at least one page of data into the Flash memory through at least one channel, wherein the controller is arranged to write data of logical addresses of discontinuous distribution into a same physical block of the blocks page by page, and is also arranged to write different versions of update data that belong to a same logical page into a plurality of physical pages of one or more of the blocks page by page, and further record information regarding which of the physical pages stores a latest version of update data;

wherein a first partial data of a specific logical page of the at least one page of data represents partial data to be written based upon a specific write command from a host device; and the controller obtains non-updated partial data of the specific logical page from the Flash memory, and writes the first partial data and the non-updated partial data of the specific logical page into a first physical page of the plurality of physical pages through a specific channel of the channels, wherein the specific logical page belongs to the specific channel, and the first partial data comprises one or more sectors of the specific logical page, and has a data amount which is less than that of one page, wherein the non-updated partial data of the specific logical page comprises at least one other sector of the specific logical page, and has a data amount which is less than that of one page.

9. The memory device of claim 8, wherein the address-to-channel mapping relationships are logical sector address-to-channel mapping relationships.

10. The memory device of claim 9, wherein the address-to-channel mapping relationships represent mapping relationships that a plurality of logical sector addresses respectively correspond to the channels.

11. The memory device of claim 9, wherein the controller bit-shifts a specific logical sector address to the right by a predetermined number of bits, in order to generate a shifted result; and the controller divides the shifted result by a predetermined divisor to calculate a remainder thereof, and utilizes the remainder as an index of a channel.

12. The memory device of claim 8, wherein the first partial data does not comprise a last sector of the specific logical page.

13. The memory device of claim 8, wherein the first partial data comprises a last sector of the specific logical page.

14. The memory device of claim 8, wherein a second partial data of another logical page of the at least one page of data represents other partial data to be written based upon the specific write command; and the controller obtains non-updated partial data of the other logical page from the Flash memory, and writes the second partial data and the non-updated partial data of the other logical page into a second physical page of the plurality of physical pages through another channel of the channels, wherein the other logical page belongs to the other channel, and the second partial data comprises one or more sectors of the other logical page, and has a data amount which is less than that of one page, wherein the non-updated partial data of the other logical page comprises at least one other sector of the other logical page, and has a data amount which is less than that of one page.

15. A controller of a memory device, the controller being utilized for accessing a Flash memory having multiple channels, the Flash memory comprising a plurality of blocks respectively corresponding to the channels, the controller comprising:

a read only memory (ROM) arranged to store a program code; and a microprocessor arranged to execute the program code to control the access to the Flash memory and manage the plurality of blocks, wherein the controller that executes the program code by utilizing the microprocessor obtains at least one portion of a plurality of address-to-channel mapping relationships, for use of writing/programming operations, and according to at least one address-to-channel mapping relationship of the plurality of address-to-channel mapping relationships, the controller that executes the program code by utilizing the microprocessor programs at least one page of data into the Flash memory through at least one channel, wherein the controller is arranged to write data of logical addresses of discontinuous distribution into a same physical block of the blocks page by page, and is also arranged to write different versions of update data that belong to a same logical page into a plurality of physical pages of one or more of the blocks page by page, and further record information regarding which of the physical pages stores a latest version of update data;

wherein a first partial data of a specific logical page of the at least one page of data represents partial data to be written based upon a specific write command from a host device; and the controller obtains non-updated partial data of the specific logical page from the Flash memory, and writes the first partial data and the non-updated partial data of the specific logical page into a first physical page of the plurality of physical pages through a specific channel of the channels, wherein the specific logical page belongs to the specific channel, and the first partial data comprises one or more sectors of the specific logical page, and has a data amount which is less than that of one page, wherein the non-updated partial data of the specific logical page comprises at least one other sector of the specific logical page, and has a data amount which is less than that of one page.

16. The controller of claim 15, wherein the address-to-channel mapping relationships are logical sector address-to-channel mapping relationships.

17. The controller of claim 16, wherein the address-to-channel mapping relationships represent mapping relationships that a plurality of logical sector addresses respectively correspond to the channels.

18. The controller of claim 16, wherein the controller bit-shifts a specific logical sector address to the right by a predetermined number of bits, in order to generate a shifted result; and the controller divides the shifted result by a predetermined divisor to calculate a remainder thereof, and utilizes the remainder as an index of a channel.

19. The controller of claim 15, wherein the first partial data comprises a last sector of the specific logical page.

20. The controller of claim 15, wherein a second partial data of another logical page of the at least one page of data represents other partial data to be written based upon the specific write command; and the controller obtains non-updated partial data of the other logical page from the Flash memory, and writes the second partial data and the non-updated partial data of the other logical page into a second physical page of the plurality of physical pages through another channel of the channels, wherein the other logical page belongs to the other channel, and the second partial data comprises one or more sectors of the other logical page, and has a data amount which is less than that of one page, wherein the non-updated partial data of the other logical page comprises at least one other sector of the other logical page, and has a data amount which is less than that of one page.

* * * * *